United States Patent
Shikata et al.

(10) Patent No.: US 12,421,333 B2
(45) Date of Patent: Sep. 23, 2025

(54) POLYETHYLENE POWDER AND MOLDED ARTICLE THEREOF

(71) Applicant: Asahi Kasei Kabushiki Kaisha, Tokyo (JP)

(72) Inventors: Kazuya Shikata, Tokyo (JP); Haruka Yokoyama, Tokyo (JP)

(73) Assignee: Asahi Kasei Kabushiki Kaisha, Tokyo (JP)

(*) Notice: Subject to any disclaimer, the term of this patent is extended or adjusted under 35 U.S.C. 154(b) by 664 days.

(21) Appl. No.: 17/792,007

(22) PCT Filed: Jan. 25, 2021

(86) PCT No.: PCT/JP2021/002500
§ 371 (c)(1),
(2) Date: Jul. 11, 2022

(87) PCT Pub. No.: WO2021/153520
PCT Pub. Date: Aug. 5, 2021

(65) Prior Publication Data
US 2023/0056794 A1 Feb. 23, 2023

(30) Foreign Application Priority Data
Jan. 31, 2020 (JP) ................... 2020-015473

(51) Int. Cl.
*H01M 50/417* (2021.01)
*C08F 110/02* (2006.01)
*C08J 3/12* (2006.01)

(52) U.S. Cl.
CPC .............. *C08F 110/02* (2013.01); *C08J 3/12* (2013.01); *H01M 50/417* (2021.01)

(58) Field of Classification Search
CPC ...... C08F 110/02; C08F 10/02; C08F 210/16; C08F 4/02; C08F 4/6421; C08F 2500/17;
(Continued)

(56) References Cited

U.S. PATENT DOCUMENTS

| | | | |
|---|---|---|---|
| 3,917,575 A | 11/1975 | Matsuura et al. | |
| 4,383,095 A | 5/1983 | Goeke et al. | |

(Continued)

FOREIGN PATENT DOCUMENTS

| | | |
|---|---|---|
| EP | 4050043 A1 | 8/2022 |
| JP | S49-086483 A | 8/1974 |

(Continued)

OTHER PUBLICATIONS

International Search Report issued in corresponding International Patent Application No. PCT/JP2021/002500 dated Mar. 23, 2021.
(Continued)

*Primary Examiner* — Alicia Bland
(74) *Attorney, Agent, or Firm* — Morgan, Lewis & Bockius LLP

(57) ABSTRACT

A polyethylene powder satisfying (Requirements 1 to 3):
(Requirement 1): viscosity-average molecular weight (Mv) is 200,000 or more and 3,000,000 or less
(Requirement 2): complex viscosity $|\eta^*|_m$ obtained by measurement under predetermined <Conditions for Measurement of Slurry Viscoelasticity> satisfies the following formula (1):

$$590.0\times(Mv\times10^{-4})^{1.18} \geq |\eta^*|_m \geq 13.3\times(Mv\times10^{-4})^{1.18} \quad (1)$$

(Requirement 3): a value of any peak when $d(\log|\eta^*|)/dT$ is plotted against temperature is 1.0 or more and 3.0 or less.

20 Claims, 2 Drawing Sheets

(58) Field of Classification Search
CPC ............. C08F 2500/18; C08F 2500/24; C08F 4/6567; C08F 210/08; C08F 4/6546; C08J 3/12; C08J 2323/06; H01M 50/417; H01M 10/0525; Y02E 60/10
See application file for complete search history.

(56) References Cited

U.S. PATENT DOCUMENTS

| | | | | |
|---|---|---|---|---|
| 4,665,143 | A * | 5/1987 | Ahluwalia | B01J 8/0015 526/86 |
| 6,956,094 | B2 * | 10/2005 | Mawson | C08F 210/16 526/348.3 |
| 2012/0202044 | A1 | 8/2012 | Brant et al. | |
| 2017/0092920 | A1 * | 3/2017 | Matsumoto | H01M 50/403 |
| 2021/0017363 | A1 | 1/2021 | Tsujimoto | |
| 2022/0372258 | A1 * | 11/2022 | Tanaka | C08F 10/02 |

FOREIGN PATENT DOCUMENTS

| | | |
|---|---|---|
| JP | H02-021559 A | 1/1990 |
| JP | 2011-241361 A | 12/2011 |
| JP | 2014-118515 A | 6/2014 |
| JP | 5876632 B1 | 3/2016 |
| JP | 2018-095352 A | 6/2018 |
| JP | 2018-095862 A | 6/2018 |
| JP | 2018-138642 A | 9/2018 |
| JP | 2019-038931 A | 3/2019 |
| WO | 2019/187727 A1 | 10/2019 |
| WO | 2020/189443 A1 | 9/2020 |

OTHER PUBLICATIONS

European Search Report issued in corresponding European Patent Application No. 21747533.4 dated Jun. 19, 2023.
International Preliminary Report on Patentability and Written Opinion issued in corresponding International Patent Application No. PCT/JP2021/002500 dated Aug. 11, 2022.

* cited by examiner

[Figure 1]
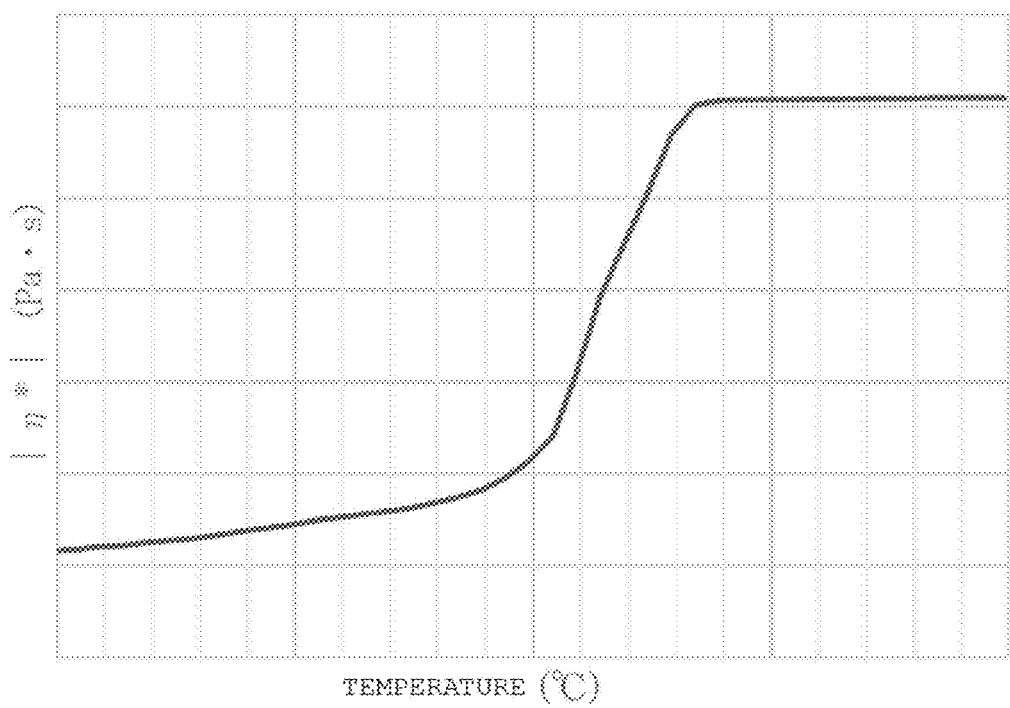

[Figure 2]
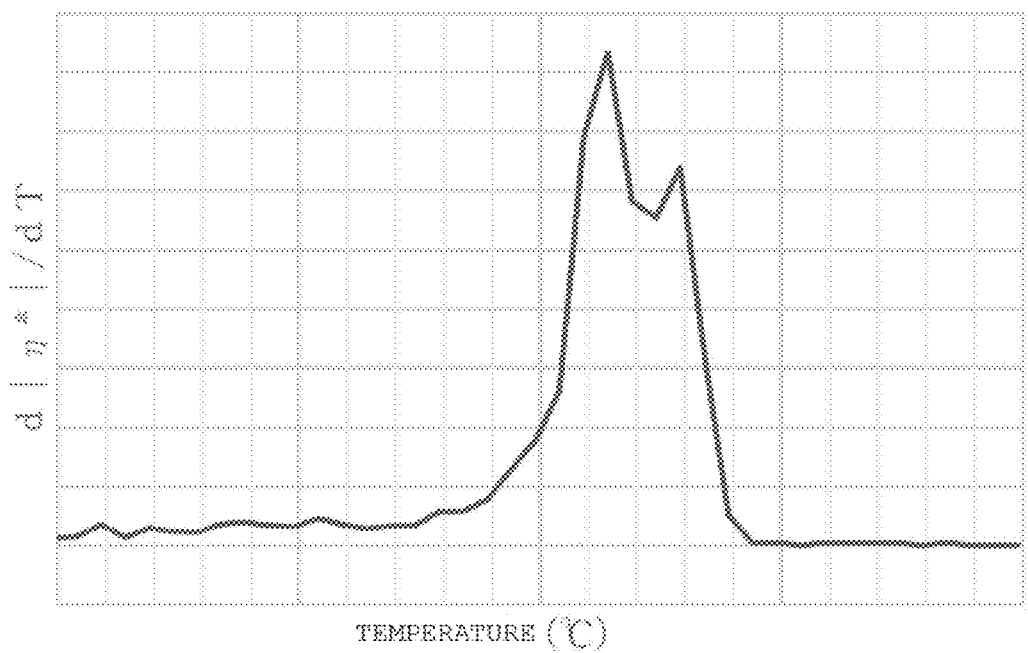

POLYETHYLENE POWDER AND MOLDED ARTICLE THEREOF

TECHNICAL FIELD

The present invention relates to a polyethylene powder and a molded article thereof.

BACKGROUND ART

Polyethylene has been conventionally used as a material for a wide variety of applications such as films, sheets, microporous membranes, fibers, foams, and pipes, because polyethylene is easy to melt-process, and molded articles of polyethylene have high mechanical strength and are also excellent in chemical resistance, rigidity, and the like.

Particularly, ultrahigh molecular weight polyethylene has higher mechanical strength and is excellent in sliding properties and wear resistance and also excellent in chemical stability and long-term reliability and therefore has high practical applicability.

However, a problem of ultrahigh molecular weight polyethylene powders is that they have low fluidity even if melted at a temperature equal to or more than the melting point. Therefore, as general methods for forming ultrahigh molecular weight polyethylene, a method involving processing an ultrahigh molecular weight polyethylene powder in a dissolved state in a solvent and then removing the solvent are known, for example.

For example, a method for stretching or heat setting is disclosed, the method including adding a solvent such as a liquid paraffin or decalin to an ultrahigh molecular weight polyethylene powder to form a slurry, heating and kneading the slurry by an extruder, then subjecting the resulting slurry to stretching into the form of a sheet or thread with cooling, then removing the solvent by, for example, extraction, and subsequently reheating the resultant to the vicinity of the melting point (see, for example, Patent Document 1).

Microporous membranes formed by using polyethylene powders are used as materials for batteries. In recent years, for the purpose of achieving downsizing, larger capacity, and higher power of batteries, even thinner films are required, and therefore various techniques intended for higher strength associated with thinner microporous membranes are disclosed (see, for example, Patent Document 2 and Patent Document 3).

LIST OF PRIOR ART DOCUMENTS

Patent Document

Patent Document 1: Japanese Patent Laid-Open No. 2-21559
Patent Document 2: Japanese Patent Laid-Open No. 2011-241361
Patent Document 3: Japanese Patent No. 5876632

SUMMARY OF INVENTION

Problems to be Solved by Invention

Generally, as methods for enhancing the strength of a microporous membrane, a method involving increasing the molecular weight of polyethylene used as a starting material and a method involving increasing the stretching ratio are known, for example.

However, when the molecular weight of polyethylene is simply increased, problems are that melting and kneading is insufficient to cause the poor appearance of the microporous membrane, and that poor appearance due to melt fracture occurs, for example. When the stretching ratio is simply increased, problems are that force is needed for stretching to confront a mechanical limit, and that membrane tearing occurs in a portion held by a chuck, for example. Thus, there is a limit to strength improvement by the method involving increasing the molecular weight of polyethylene, or the method involving increasing the stretching ratio.

In addition, when a high strength microporous membrane is made by using polyethylene having high molecular weight, problems are that melting and kneading is insufficient to result in the polyethylene nonuniformly dispersed, which causes the tight winding of the product roll or variations in air permeability occur in the microporous membrane.

Accordingly, in view of the problems, it is an object of the present invention to provide a polyethylene powder that provides a microporous membrane having high mechanical strength, not causing the tight winding of a roll, and having small variations in air permeability.

Means for Solving Problems

As a result of diligently studies to solve the problems, the present inventors have found that a polyethylene powder having a viscosity-average molecular weight in a particular range and satisfying predetermined physical properties defined by predetermined viscoelasticity measurement conditions can solve the problems, and have completed the present invention.

Specifically, the present invention is as follows.

[1]
A polyethylene powder satisfying the following (Requirements 1 to 3):
(Requirement 1): viscosity-average molecular weight (Mv) is 200,000 or more and 3,000,000 or less
(Requirement 2): complex viscosity $|\eta^*|_m$ obtained by measurement under the following <Conditions for Measurement of Slurry Viscoelasticity> satisfies the following formula (1):

$$590.0 \times (Mv \times 10^{-4})^{1.18} \geq |\eta^*|_m \geq 13.3 \times (Mv \times 10^{-4})^{1.18} \tag{1}$$

<Conditions for Measurement of Slurry Viscoelasticity>
measuring apparatus: MARS III manufactured by Thermo Fisher Scientific K.K.
stage: 20 mm $\phi$
plate: 20 mm $\phi$ parallel plate
gap: 0.5 mm
slurry composition: 30 parts by mass of a polyethylene powder, 70 parts by mass of a liquid paraffin
(the polyethylene powder: a powder passing through a sieve having an opening of 425 μm in accordance with a JIS Z 8801 standard is used for measurement)
measurement conditions: complex viscosity I*I is measured by the following steps 1 to 2:
step 1 a slurry is kept at 100° C. for 2 min
step 2 after the step 1, temperature is increased from 100° C. to 140° C. at 1° C./min, and viscoelasticity during the temperature increase is measured at a frequency of 1 Hz and a strain of 10% under a nitrogen atmosphere
determination of $|\eta^*|_m$: a temperature at a point in time when a value of $d(\log|\eta^*|)/dT$ associated with dissolution of the polyethylene powder first reaches 0.03 or less after passing a peak is regarded as a temperature at which the dissolution of the polyethylene powder is completed, and complex viscosity |η*| at the temperature is |η*|$_m$ (T is Measurement Temperature)

(Requirement 3): a value of any peak when d(log|η*|)/dT is plotted against temperature is 1.0 or more and 3.0 or less.

[2]

The polyethylene powder according to [1], wherein the number of peaks when d(log|η*|)/dT is plotted against temperature is 2 or more.

[3]

The polyethylene powder according to [1] or [2], wherein a value of the |η*|$_m$ is $1.0 \times 10^3$ or more and $3.0 \times 10^4$ or less.

[4]

The polyethylene powder according to any one of [1] to [3], wherein an amount of a fraction remaining on a sieve having an opening of 300 μm obtained by classification is 3.0% by mass or less.

[5]

The polyethylene powder according to any one of [1] to [4], wherein isothermal crystallization time at 125° C. obtained by the following <Conditions for Measurement of Isothermal Crystallization Time> is less than 4.0 min, <Conditions for Measurement of Isothermal Crystallization Time> step A1: the polyethylene powder is maintained at 50° C. for 1 min, and then temperature is increased to 180° C. at a temperature increase rate of 10° C./min step A2: the polyethylene powder is maintained at 180° C. for 5 min, and then the temperature is decreased to 125° C. at a temperature decrease rate of 80° C./min step A3: the polyethylene powder is maintained at 125° C., and a time when an exothermic peak top due to crystallization is obtained is taken as isothermal crystallization time, provided that a point in time when the temperature reaches 125° C. is a starting point (0 min).

[6]

The polyethylene powder according to any one of [1] to [5], wherein the polyethylene powder is an ethylene homopolymer.

[7]

The polyethylene powder according to any one of [1] to [6], wherein the viscosity-average molecular weight (Mv) is 230,000 or more and 2,800,000 or less.

[8]

The polyethylene powder according to any one of [1] to [7], wherein the viscosity-average molecular weight (Mv) is 250,000 or more and 2,200,000 or less.

[9]

The polyethylene powder according to any one of [1] to [8], wherein the complex viscosity |η*|$_m$ satisfies the following formula (2):

$$100.0 \times (Mv \times 10^{-4})^{1.18} \geq |\eta^*|_m \geq 20.0 \times (Mv \times 10^{-4})^{1.18} \quad (2)$$

[10]

The polyethylene powder according to any one of [1] to [9], wherein the value of any peak when d(log|η*|)/dT is plotted against temperature is 1.2 or more and 2.7 or less.

[11]

The polyethylene powder according to any one of [1] to [10], wherein the value of any peak when d(log|η*|)/dT is plotted against temperature is 1.4 or more and 2.5 or less.

[12]

The polyethylene powder according to any one of [1] to [11], wherein a value of a maximum peak when d(log|η*|)/dT is plotted against temperature is 1.0 or more and 3.0 or less.

[13]

The polyethylene powder according to any one of [1] to [12], wherein the value of the maximum peak when d(log|η*|)/dT is plotted against temperature is 1.2 or more and 2.7 or less.

[14]

The polyethylene powder according to any one of [1] to [13], wherein the value of the maximum peak when d(log|η*|)/dT is plotted against temperature is 1.4 or more and 2.5 or less.

[15]

The polyethylene powder according to any one of [1] to [14], wherein a value of the complex viscosity |η*|$_m$ is $2.0 \times 10^3$ or more and $1.5 \times 10^4$ or less.

[16]

The polyethylene powder according to any one of [1] to [15], wherein Mw/Mn and Mz/Mw obtained by GPC (gel permeation chromatography) measurement in which a differential refractometer and a light scattering detector are connected are 4.0 or more and 10.0 or less, and 2.0 or more and 7.0 or less, respectively.

[17]

A molded article of the polyethylene powder according to any one of [1] to [16].

[18]

The molded article according to [17], wherein the molded article is a separator for a battery.

[19]

The molded article according to [18], wherein the molded article is a separator for a lithium ion secondary battery.

Advantages of Invention

According to the present invention, it is possible to provide a polyethylene powder that provides a microporous membrane having high mechanical strength, providing reduced tight winding of a roll, and having small variations in air permeability.

BRIEF DESCRIPTION OF DRAWINGS

FIG. 1 shows an example of the measurement results of change in complex viscosity with respect to temperature change.

FIG. 2 shows an example of the measurement results of "d(log|η*|)/dT," which represents the degree of complex viscosity change with respect to temperature change.

MODE FOR CARRYING OUT INVENTION

A mode for carrying out the present invention (hereinafter also referred to as the "present embodiment") will be described in detail below.

The present embodiment below is an illustration for describing the present invention and is not intended to limit the present invention to the following contents. Various modifications can be made to the present invention without departing from the spirit thereof.

[Polyethylene Powder]

A polyethylene powder of the present embodiment satisfies the following (Requirements 1 to 3):

(Requirement 1): viscosity-average molecular weight (Mv) is 200,000 or more and 3,000,000 or less (Requirement 2): complex viscosity $|\eta^*|_m$ obtained by measurement under the following <Conditions for Measurement of Slurry Viscoelasticity> satisfies the following formula (1):

$$590.0 \times (Mv \times 10^{-4})^{1.18} \geq |\eta^*|_m \geq 13.3 \times (Mv \times 10^{-4})^{1.18} \quad (1)$$

<Conditions for Measurement of Slurry Viscoelasticity measuring apparatus: MARS III manufactured by Thermo Fisher Scientific K.K.
stage: 20 mm ϕ
plate: 20 mm ϕ parallel plate
gap: 0.5 mm
slurry composition: 30 parts by mass of a polyethylene powder, 70 parts by mass of a liquid paraffin
(the polyethylene powder: a powder passing through a sieve having an opening of 425 μm in accordance with a JIS Z 8801 standard is used for measurement)
measurement conditions: complex viscosity $|\eta^*|$ is measured by the following steps 1 to 2:
step 1 a slurry is kept at 100° C. for 2 min
step 2 after the step 1, temperature is increased from 100° C. to 140° C. at 1° C./min, and viscoelasticity during the temperature increase is measured at a frequency of 1 Hz and a strain of 10% under a nitrogen atmosphere
determination of $|\eta^*|_m$: a temperature at a point in time when a value of $d(\log|\eta^*|)/dT$ associated with dissolution of the polyethylene powder first reaches 0.03 or less after passing a peak is regarded as a temperature at which the dissolution of the polyethylene powder is completed, and complex viscosity $|\eta^*|$ at the temperature is $|\eta^*|_m$
(T is Measurement Temperature)
(Requirement 3): a value of any peak when $d(\log|\eta^*|)/dT$ is plotted against temperature is 1.0 or more and 3.0 or less.

Since the polyethylene powder of the present embodiment has the above configuration, a microporous membrane that is a molded article of the polyethylene powder of the present embodiment exhibits the effect of having high mechanical strength, providing reduced tight winding of a roll, and having small variations in air permeability.

The configuration of the polyethylene powder of the present embodiment will be described below.
(Polyethylene Powder)

The polyethylene powder of the present embodiment is composed of an ethylene polymer.

In the ethylene polymer, 99.5 mol % or more, preferably 99.8 mol % or more, of the constituent units are ethylene units, and more preferably 100 mol % of the constituent units are ethylene units, that is, the ethylene polymer is an ethylene homopolymer.

For the purpose of improving the polymerization rate and improving the fabricability during membrane formation, a very small amount of a copolymerizable component such as an α-olefin can also be added to the ethylene polymer to introduce a branch.

The copolymerizable component when the ethylene polymer is a copolymer is not particularly limited, and examples thereof include α-olefins and vinyl compounds.

Examples of the α-olefins include, but are not limited to, α-olefins having 3 to 20 carbon atoms, specifically, propylene, 1-butene, 4-methyl-1-pentene, 1-hexene, 1-octene, 1-nonene, 1-decene, 1-undecene, 1-dodecene, 1-tridecene, and 1-tetradecene.

Examples of the vinyl compounds include, but are not limited to, vinylcyclohexane, styrene, and derivatives thereof.

A nonconjugated polyene such as 1,5-hexadiene or 1,7-octadiene can also be used as another comonomer, as needed.

Only one copolymerizable component may be used alone, or two or more copolymerizable components may be used in combination.

The amount of another comonomer in the copolymer when the ethylene polymer is the copolymer can be confirmed by an NMR method or the like.

Polyethylenes having different viscosity-average molecular weights, molecular weight distributions, or the like can also be blended into the polyethylene powder of the present embodiment, and low density polyethylene and linear low density polyethylene as well as other resins such as polypropylene and polystyrene can also be blended.

The polyethylene powder of the present embodiment may be a polymer produced in a single polymerization reactor, or a multistage polymer produced by a multistage polymerization apparatus.

The polyethylene powder of the present embodiment can be preferably used in the form of a powder, and can also be preferably processed into the form of pellets and then used.
(Particle Diameter of Polyethylene Powder)

The average particle diameter of the polyethylene powder of the present embodiment is preferably 500 μm or less, more preferably 300 μm or less, and further preferably 150 μm or less. The average particle diameter of the polyethylene powder is preferably 5 μm or more, more preferably 10 μm or more.

When the average particle diameter of the polyethylene powder is 500 μm or less, the solubility of the polyethylene powder in a solvent improves more, and the undissolved residue that impairs the performance and appearance of the fabricated article can be reduced.

When the average particle diameter of the polyethylene powder is 5 μm or more, the scattering of the powder is suppressed to thereby improve the handling properties more. In addition, when the powder having an average particle diameter of 5 μm or more is added to a solvent, the formation of lumps is suppressed, which results in that the formation of a uniform slurry tends to be easier.

The average particle diameter of the polyethylene powder herein is the particle diameter at which the cumulative weight is 50%, that is, the median diameter.
(Density of Polyethylene Powder)

The density of the polyethylene powder of the present embodiment is not particularly limited but is preferably 910 kg/m³ or more and 980 kg/m³ or less, more preferably 915 kg/m³ or more and 970 kg/m³ or less, and further preferably 920 kg/m³ or more and 965 kg/m³ or less.

When the density of the polyethylene powder is 910 kg/m³ or more and 980 kg/m³ or less, a molded article containing the polyethylene powder of the present embodiment has excellent strength.

The polyethylene powder of the present embodiment satisfies the following (Requirements 1 to 3):
(Requirement 1): The viscosity-average molecular weight (Mv) is 200,000 or more and 3,000,000 or less.
(Requirement 2): The complex viscosity $|\eta^*|m$ obtained by measurement under the following <Conditions for Measurement of Slurry Viscoelasticity> satisfies the following formula (1):

$$590.0 \times (Mv \times 10^{-4})^{1.18} \geq |\eta^*|_m \geq 13.3 \times (Mv \times 10^{-4})^{1.18} \quad (1)$$

<Conditions for Measurement of Slurry Viscoelasticity>
measuring apparatus: MARS III manufactured by Thermo Fisher Scientific K.K.
stage: 20 mm $\phi$
plate: 20 mm $\phi$ parallel plate
gap: 0.5 mm
slurry composition: polyethylene powder 30 parts by mass, liquid paraffin 70 parts by mass (the polyethylene powder: a powder passing through a sieve having an opening of 425 µm in accordance with the JIS Z 8801 standard is used for measurement.)
measurement conditions: The complex viscosity $|\eta^*|$ is measured by the following steps 1 to 2.

FIG. 1 shows a schematic diagram of the measurement results of change in complex viscosity $|\eta^*|$ with respect to temperature change.

step 1 a slurry is kept at 100° C. for 2 min.
step 2 after the step 1, the temperature is increased from 100° C. to 140° C. at 1° C./min. The viscoelasticity during the temperature increase is measured at a frequency of 1 Hz and a strain of 10% under a nitrogen atmosphere.
determination of $|\eta^*|_m$: a temperature at the point in time when the value of $d(\log|\eta^*|)/dT$ associated with the dissolution of the polyethylene powder first reaches 0.03 or less after passing a peak is regarded as the temperature at which the dissolution of the polyethylene powder is completed, and the complex viscosity $|\eta^*|$ at the temperature is $|\eta^*|m$.

FIG. 2 shows a schematic diagram of the measurement results of "$d(\log|\eta^*|)/dT$" representing the degree of complex viscosity change with respect to temperature change.

(Requirement 3): The value of any peak when $d(\log|\eta^*|)/dT$ is plotted against temperature is 1.0 or more and 3.0 or less.

The configuration of the polyethylene powder of the present embodiment will be described below.

(Viscosity-Average Molecular Weight (Mv))

The viscosity-average molecular weight (Mv) of the polyethylene powder of the present embodiment is 200,000 or more and 3,000,000 or less, preferably 230,000 or more and 2,800,000 or less, and more preferably 250,000 or more and 2,200,000 or less.

When Mv is 200,000 or more, the mechanical strength of a microporous membrane increases. On the other hand, when Mv is 3,000,000 or less, the fabricability in membrane formation, stretching, and the like is excellent.

Mv can be controlled in the numerical value range by using catalysts described later and appropriately adjusting the polymerization conditions and the like. As for the specific polymerization conditions, hydrogen is allowed to be present in the polymerization system, and/or the polymerization temperature is changed, for example. Thus, the viscosity-average molecular weight can be controlled.

$M_v$ can be measured by a method described in Examples described later.

(Relationship Between $|\eta^*|_m$ and $M_v$; Formula (1) and Formula (2))

A slurry solution of 30 parts by mass of the polyethylene powder of the present embodiment and 70 parts by mass of a liquid paraffin is prepared, and the complex viscosity with respect to temperature change is measured under the <Conditions for Measurement of Slurry Viscoelasticity>. The obtained $|\eta^*|_m$ satisfies the following formula (1), preferably the following formula (2).

$$590.0 \times (Mv \times 10^{-4})^{1.18} \geq |\eta^*|_m \geq 13.3 \times (Mv \times 10^{-4})^{1.18} \quad (1)$$

$$100.0 \times (Mv \times 10^{-4})^{1.18} \geq |\eta^*|_m > 20.0 \times (Mv \times 10^{-4})^{1.18} \quad (2)$$

In the formula (1) and formula (2), $|\eta^*|_m$ is the complex viscosity at the point in time when the polyethylene powder melts when the slurry of the polyethylene powder and the liquid paraffin is gradually heated. It is considered that $|\eta^*|_m$ reflects the amount of entanglement of polyethylene molecules at the point in time when the polyethylene powder is a powder, and the amount of entanglement after the polyethylene molecules diffuse into the liquid paraffin and reach a stable state, because melting and kneading by physical external force is not performed in the measurement method.

It is considered that the polyethylene powder of the present embodiment satisfying the formula (1) has high $|\eta^*|_m$ compared with existing polyethylene, that is, the amount of entanglement of polyethylene molecules at the point in time when the polyethylene powder is a powder is large, and the polyethylene molecules maintain entanglement even after they diffuse into the liquid paraffin and reach a stable state.

When the complex viscosity $|\eta^*|_m$ at the point in time when the polyethylene powder melts is $13.3 \times (Mv \times 10^{-4})^{1.18}$ or more, a microporous membrane having high mechanical strength can be obtained. On the other hand, when the complex viscosity $|\eta^*|_m$ is $590.0 \times (Mv \times 10^{-4})^{1.18}$ or less, the fabricability in membrane formation, stretching, and the like is excellent.

The complex viscosity $|\eta^*|_m$ at the point in time when the polyethylene powder melts can be measured by a method described in Examples described later.

($d(\log|\eta^*|)/dT$)

A slurry solution of 30 parts by mass of the polyethylene powder of the present embodiment and 70 parts by mass of a liquid paraffin is prepared, and the complex viscosity with respect to temperature change is measured under the <Conditions for Measurement of Slurry Viscoelasticity> to obtain $d(\log|\eta^*|)/dT$. The value of any peak when the obtained $d(\log|\eta^*|)/dT$ is plotted against temperature is 1.0 or more and 3.0 or less, preferably 1.2 or more and 2.7 or less, and more preferably 1.4 or more and 2.5 or less.

It is considered that when $d(\log|\eta^*|)/dT$ is a positive value, the polyethylene molecules diffuse into the liquid paraffin at the temperature, and that the magnitude of the value represents the rate at which the complex viscosity increases, that is, the rate at which the polyethylene molecules diffuse.

When the value of any peak of $d(\log|\eta^*|)/dT$ is 1.0 or more, the crystal size of the polyethylene molecules is not too large, and the diffusion rate of the polyethylene molecules is favorable. Therefore, a membrane made by using a resin composition containing such a polyethylene powder has a uniform crystal structure, and thus has small variations in tensile tension to thereby be easily controlled during winding, and therefore the tight winding of a roll can be suppressed.

When the value of any peak of $d(\log|\eta^*|)/dT$ is 3.0 or less, the polyethylene molecules have sufficient entanglement, and in a membrane made by using a resin composition containing such a polyethylene powder, pores are uniformly formed, and the local variations in air permeability are small.

$d(\log|\eta^*|)/dT$ can be measured by a method described in Examples described later.

A slurry solution of 30 parts by mass of the polyethylene powder of the present embodiment and 70 parts by mass of a liquid paraffin is prepared, and the complex viscosity with respect to temperature change is measured under the <Conditions for Measurement of Slurry Viscoelasticity> to obtain $d(\log|\eta^*|)/dT$. The value of the maximum peak when the obtained $d(\log|\eta^*|)/dT$ is plotted against temperature is preferably 1.0 or more and 3.0 or less, more preferably 1.2 or more and 2.7 or less, and further preferably 1.4 or more and 2.5 or less.

It is considered that when $d(\log|\eta^*|)/dT$ is a positive value, the polyethylene molecules diffuse into the liquid paraffin at the temperature, and that the magnitude of the value represents the rate at which the complex viscosity increases, that is, the rate at which the polyethylene molecules diffuse.

When the value of the maximum peak of $d(\log|\eta^*|)/dT$ is 1.0 or more, the crystal size of the polyethylene molecules is not too large, and the diffusion rate of the polyethylene molecules is good. Therefore, a membrane made by using a resin composition containing such a polyethylene powder has a uniform crystal structure, and thus has small variations in tensile tension to thereby be easily controlled during winding, and therefore the tight winding of a roll can be suppressed.

When the value of the maximum peak of $d(\log|\eta^*|)/dT$ is 3.0 or less, the polyethylene molecules have sufficient entanglement, and in a membrane made by using a resin composition containing such a polyethylene powder, pores are uniformly formed, and the local variations in air permeability are small.

$d(\log|\eta^*|)/dT$ can be measured by a method described in Examples described later.

As described above, the polyethylene powder of the present embodiment satisfying the particular requirements regarding $|\eta^*|_m$ and $d(\log|\eta^*|)/dT$ can achieve both the conflicting properties of having a fast rate at which the polyethylene molecules diffuse and yet maintaining entanglement even in a stable state after diffusion.

In order to create such a state, it is important to contain a certain amount of a component having little entanglement in polyethylene having a large amount of entanglement and to decrease the crystal size of polyethylene, and the like.

Examples of the method for obtaining such a polyethylene powder include a method involving initiating polymerization in different environments in a polymerization system, and a method involving controlling the extent of the entanglement of molecules by the preparation of catalysts.

Specific examples include using two or more types of catalysts for the polymerization of polyethylene and changing their active site density and/or mixing ratio; previously bringing partial catalysts into contact with a promoter; introducing catalysts from two places away from each other in a polymerization reactor, with cooling the catalysts from the one place upon introducing and heating the catalysts from the other place upon introducing; and carrying out the preparation of catalysts at low temperature and for a long time.

(Number of Peaks of $d(\log|\eta^*|)/dT$)

A slurry solution of 30 parts by mass of the polyethylene powder of the present embodiment and 70 parts by mass of a liquid paraffin is prepared, and the complex viscosity with respect to temperature change is measured under the <Conditions for Measurement of Slurry Viscoelasticity> to obtain $d(\log|\eta^*|)/dT$. The number of peaks when the obtained $d(\log|\eta^*|)/dT$ is plotted against temperature is preferably 2 or more.

The number of peaks being 2 or more means that the dissolution of polyethylene occurs in a wide temperature range. Such a polyethylene powder can be melted according to the melting temperature range of another starting material such as polyethylene having different molecular weight, and the occurrence of poor dispersion after kneading can be reduced. On the other hand, when the dissolution temperatures of starting materials do not match each other, poor dispersion occurs, resulting in the poor appearance of the microporous membrane. But, for the polyethylene powder of the present embodiment, the matching of the melting temperatures of the starting materials each other is easily adjusted, and therefore the dispersed state is good, resulting in good appearance characteristics of the microporous membrane.

Examples of the method for controlling the number of peaks of $d(\log|\eta^*|)/dT$ include a method involving using a plurality of types of components having different extents of the entanglement of polyethylene molecules, and a method involving decreasing the size of crystals of polyethylene.

Examples of the method involving using a plurality of types of components having different extents of the entanglement of polyethylene molecules include, but are not limited to, introducing catalysts into a plurality of places away from each other in a polymerization reactor and changing the temperatures of the catalysts in the places.

Examples of the method involving decreasing the size of crystals of polyethylene include, but are not limited to, carrying out the preparation of partial catalysts at low temperature over a long time.

The number of peaks of $d(\log|\eta^*|)/dT$ can be measured by a method described in Examples described later.

(Value of $|\eta^*|_m$)

A slurry solution of 30 parts by mass of the polyethylene powder of the present embodiment and 70 parts by mass of a liquid paraffin is prepared, and the complex viscosity with respect to temperature change is measured under the <Conditions for Measurement of Slurry Viscoelasticity>. The obtained $|\eta^*|_m$ is preferably $1.0 \times 10^3$ or more and $3.0 \times 10^4$ or less, more preferably $1.5 \times 10^3$ or more and $1.8 \times 10^4$ or less, and further preferably $2.0 \times 10^3$ or more and $1.5 \times 10^4$ or less.

When the complex viscosity $|\eta^*|_m$ is $1.0 \times 10^3$ or more, a microporous membrane having higher mechanical strength can be obtained.

When the complex viscosity $|\eta^*|_m$ is $3.0 \times 10^4$ or less, a membrane having a preferred appearance without roughness on the membrane surface can be produced.

Examples of the method for setting the complex viscosity $|\eta^*|_m$ in the predetermined range include a method involving using two or more types of catalysts for polymerization and changing their active site density and/or mixing ratio; a method involving previously bringing partial catalysts into contact with a promoter; a method involving introducing catalysts from two places away from each other in a polymerization reactor, with cooling the catalysts from the one place upon introducing and heating the catalysts from the other place upon introducing; and a method involving carrying out the preparation of catalysts at low temperature and for a long time.

The complex viscosity $|\eta^*|_m$ can be measured by a method described in Examples described later.

(Amount of Powder Larger Than 300 μm)

For the polyethylene powder of the present embodiment, the amount of the fraction remaining on a sieve having an opening of 300 μm obtained by classification is preferably 3.0% by mass or less, more preferably 2.0% by mass or less, and further preferably 1.0% by mass or less. When the amount of the fraction remaining on the sieve having an opening of 300 μm is 3.0% by mass or less, poor dispersion during melting and kneading decreases, and the poor appearance of the membrane decreases.

Examples of the method for controlling the amount of the fraction remaining on a sieve having an opening of 300 μm obtained by classification include a method involving controlling polymerization activity, and a method involving classifying the powder after polymerization and removing large particles.

The amount of the fraction remaining on a sieve having an opening of 300 μm obtained by classification can be measured by a method described in Examples described later.

(Isothermal Crystallization Time)

For the polyethylene powder of the present embodiment, the isothermal crystallization time obtained by the following <Isothermal Crystallization Time Measurement> is the time when an exothermic peak top due to crystallization is obtained at 125° C.

<Isothermal Crystallization Time Measurement>
- step A1: The polyethylene powder is maintained at 50° C. for 1 min, and then the temperature is increased to 180° C. at a temperature increase rate of 10° C./min.
- step A2: The polyethylene powder is maintained at 180° C. for 5 min, and then the temperature is decreased to 125° C. at a temperature decrease rate of 80° C./min.
- step A3: The polyethylene powder is maintained at 125° C. The time when an exothermic peak top due to crystallization is obtained is taken as the isothermal crystallization time, provided that the point in time when the temperature reaches 125° C. is regarded as a starting point (0 min).

For the polyethylene powder of the present embodiment, the isothermal crystallization time at 125° C. is preferably less than 4.0 min, more preferably 3.0 min or less, and further preferably 2.0 min or less. When the isothermal crystallization time at 125° C. is less than 4.0 min, the crystal size of a web (a sheet in a state as formed by an extruder) for membrane formation decreases so that the tight winding of a roll is even less likely to occur, and also the variations in air permeability are smaller.

Examples of the method for controlling the isothermal crystallization time include decreasing the crystal size of polyethylene. Examples of the method for decreasing the crystal size of polyethylene include, but are not limited to, a method involving carrying out the preparation of catalysts at low temperature and for a long time.

The isothermal crystallization time can be specifically measured by a method described in Examples described later.

(Mw/Mn and Mz/Mw)

For the polyethylene powder of the present embodiment, the molecular weight distribution (Mw/Mn) obtained by GPC (gel permeation chromatography) measurement in which a differential refractometer and a light scattering detector are connected is preferably 4.0 or more and 10.0 or less, more preferably 6.0 or more and 9.5 or less, and further preferably 7.0 or more and 9.0 or less.

When the molecular weight distribution of the polyethylene is within the range, the thermal properties of a microporous membrane tend to be improved.

Further, the ratio of the Z-average molecular weight to the weight-average molecular weight (Mz/Mw) of the polyethylene powder of the present embodiment is preferably 2.0 or more and 7.0 or less, more preferably 4.0 or more and 6.5 or less, and further preferably 5.0 or more and 6.0 or less.

When the Mz/Mn of the polyethylene is within the range, the thermal properties of a microporous membrane tend to be improved.

Mw/Mn and Mz/Mw can be controlled by the conditions (for example, hydrogen concentration, temperature, and ethylene pressure) in the polymerization system for polyethylene, and the conditions of the preparation of the catalysts used for the polymerization.

For example, as for the conditions in the polymerization system, keeping the conditions constant tends to decrease the Mw/Mn and Mz/Mw of the polyethylene, and intentionally fluctuating the conditions (for example, changing the concentration of hydrogen, which is a chain transfer agent, during the polymerization) tends to increase the Mw/Mn and Mz/Mw of the polyethylene. For example, as for the conditions of the preparation of the catalysts, relatively uniformly adjusting the polymerization sites of the catalysts tends to decrease the Mw/Mn and Mz/Mw of the polyethylene, and conversely, relatively nonuniformly adjusting the polymerization sites of the catalysts tends to increase the Mw/Mn and Mz/Mw of the polyethylene.

Mw/Mn and Mz/Mw can be measured by a method described in Examples described later.

[Method for Producing Polyethylene Powder]

Examples of the method for producing the polyethylene powder of the present embodiment include, but are not limited to, a method including (co)polymerizing ethylene or a monomer containing ethylene by various polymerization methods such as a slurry polymerization method, a gas phase polymerization method, and a solution polymerization method.

Among these, the slurry polymerization method, in which polymerization heat can be efficiently removed, is preferable.

In the slurry polymerization method, an inert hydrocarbon medium can be used as a medium, and the olefin itself can also be used as a medium.

Examples of the inert hydrocarbon medium can include, but are not limited to, aliphatic hydrocarbons such as propane, butane, isobutane, pentane, isopentane, hexane, heptane, octane, decane, dodecane, and kerosene; alicyclic hydrocarbons such as cyclopentane, cyclohexane, and methylcyclopentane; aromatic hydrocarbons such as benzene, toluene, and xylene; halogenated hydrocarbons such as ethyl chloride, chlorobenzene, and dichloromethane; and mixtures thereof.

The temperature of the polymerization reactor in the method for producing the polyethylene powder of the present embodiment is usually preferably 40° C. or more and 100° C. or less, more preferably 45° C. or more and 95° C. or less, and further preferably 50° C. or more and 90° C. or less.

When the polymerization temperature is 40° C. or more, industrially efficient production tends to be able to be performed. On the other hand, when the polymerization temperature is 100° C. or less, continuously stable operation tends to be able to be performed.

The pressure of the polymerization reactor in the method for producing the polyethylene powder of the present embodiment is usually preferably 0.10 MPa or more and 2.0 MPa or less, more preferably 0.10 MPa or more and 1.5 MPa or less, and further preferably 0.10 MPa or more and 1.0 MPa or less.

The polymerization reaction can be performed by any of batch, semicontinuous, and continuous methods, and particularly, the polymerization reaction is preferably performed by a continuous method.

By continuously supplying ethylene gas, a solvent (for example, hexane), catalysts, and others into the polymerization system and continuously discharging the ethylene gas, the solvent, the catalysts, and others together with the produced polyethylene powder, a partial high temperature state due to a sudden reaction of ethylene can be suppressed, and the interior of the polymerization system tends to be more stabilized.

Preferred examples of the catalyst components used for the production of the polyethylene powder of the present embodiment can include Ziegler-Natta catalysts, metallocene catalysts, and Phillips catalysts.

As the Ziegler-Natta catalysts, those described in Japanese Patent No. 5767202 can be preferably used. The metallocene catalysts are not limited to the following, but, for example, those described in Japanese Patent Laid-Open No. 2006-273977 and Japanese Patent No. 4868853 can be preferably used.

A promoter such as triisobutylaluminum or the Tebbe reagent may be included in the catalyst components used for the production of the polyethylene powder of the present embodiment.

As the catalysts used for the production of the polyethylene powder of the present embodiment, at least two catalysts having different active site densities are preferably mixed and used. From the catalyst having high active site density, polyethylene having a large extent of the entanglement of molecules is polymerized, and from the catalyst having low active site density, polyethylene having a small extent of the entanglement of molecules is polymerized. By mixing and using a plurality of catalysts having different active site densities, the extent of the entanglement of molecules can be suitably controlled.

In the catalysts used for the production of the polyethylene powder of the present embodiment, each of at least two catalysts having different active site densities is preferably used in an amount of at least 10% by mass with respect to 100% by mass of the total of the catalysts. By using each of two or more catalysts having different active site densities in an amount of at least 10% by mass based on the total of the catalysts, the effect of each catalyst on the control of the extent of the entanglement of molecules is easily exhibited. By controlling the proportion of each catalyst, the extent of the entanglement of molecules can be suitably controlled.

For the method for adding the catalysts used for the production of the polyethylene powder of the present embodiment, a method involving mixing at least two catalysts having different active site densities before placing them in the polymerization reactor may be applied, or a method involving separately introducing the catalysts into the polymerization reactor without mixing them may be applied.

The catalysts used for the production of the polyethylene powder of the present embodiment are preferably prepared at low temperature over a long time. By using the catalysts prepared at low temperature over a long time, polyethylene having a small crystal size tends to be obtained, which is preferable.

The temperature of the preparation of the catalysts used for the production of the polyethylene powder of the present embodiment is preferably $-10°$ C. or less. As for the time of the preparation of the catalysts used for the production of the polyethylene powder of the present embodiment, the catalysts are preferably prepared over 20 hr or more in the step of reacting titanium tetrachloride with catalyst starting materials.

As the method for using the catalysts used for the production of the polyethylene powder of the present embodiment, a method involving bringing partial catalysts into contact with a small amount of a promoter prior to introduction into the polymerization reactor is preferably applied.

By bringing partial catalysts into contact with a small amount of a promoter prior to introduction into the polymerization reactor, the extent of the entanglement of molecules of polyethylene can be increased, which is preferable.

In the method for using the catalysts used for the production of the polyethylene powder of the present embodiment, the amount of the catalysts brought into contact with the small amount of the promoter prior to introduction into the polymerization reactor is preferably 5% by mass or more and 50% by mass or less based on the total of the catalysts. By bringing 5% by mass or more based on the total of the catalysts into contact with the small amount of the promoter prior to introduction into the polymerization reactor, the extent of the entanglement of molecules can be increased. By bringing 50% by mass or less based on the total of the catalysts into contact with the small amount of the promoter prior to introduction into the polymerization reactor, the worsening of fabricability due to an excessive increase in the extent of the entanglement of molecules can be avoided.

As the method for using the catalysts used for the production of the polyethylene powder of the present embodiment, the amount of the promoter with which the partial catalysts are brought into contact prior to introduction into the polymerization reactor is preferably 0.1% by mass or more and 2.0% by mass or less based on the catalysts. By bringing the promoter in an amount of 0.1% by mass or more based on the catalysts into contact with the catalysts prior to introduction into the polymerization reactor, the extent of the entanglement of molecules can be increased. By bringing the promoter in an amount of 2.0% by mass or less based on the catalysts into contact with the catalysts prior to introduction into the polymerization reactor, the worsening of fabricability due to an excessive increase in the extent of the entanglement of molecules can be avoided.

As the method for using the catalysts used for the production of the polyethylene powder of the present embodiment, it is preferable to introduce the catalysts into a plurality of places away from each other in the polymerization reactor and change the temperatures of the catalysts in the places. By introducing the catalysts into a plurality of places away from each other in the polymerization reactor and changing the temperatures of the catalysts in the places, the extent of the entanglement of polyethylene molecules can be controlled to produce a plurality of types of components having different extents of the entanglement of polyethylene molecules.

As for the method for using the catalysts used for the production of the polyethylene powder of the present embodiment, the catalysts are preferably introduced from at least two or more places in the polymerization reactor. The respective introduction places are preferably positions away from each other in the polymerization reactor, and considering the stirring state in the polymerization reactor, the respective introduction places are more preferably in a positional relationship in which the introduced catalysts are not carried to the vicinity of another introduction place.

As for the method for using the catalysts used for the production of the polyethylene powder of the present embodiment, the temperature of the introduced catalysts is preferably −50° C. or more and 0° C. or less with respect to the temperature of the polymerization reactor, that is, (the temperature of the polymerization reactor−50° C.) to (the temperature of the polymerization reactor). When the temperature of the introduced catalysts is in the range, polymerization can be stably performed.

As for the method for using the catalysts used for the production of the polyethylene powder of the present embodiment, the catalysts are preferably introduced from a plurality of places and introduced with a difference of 20° C. or more between the temperatures of the catalysts in the places. When the difference between the temperatures of the catalysts in the places is 20° C. or more, the extent of the entanglement of polyethylene molecules in the places can be effectively changed.

The average particle diameters of the catalysts used in the method for producing the polyethylene powder of the present embodiment are preferably 0.1 μm or more and m or less, more preferably 0.2 μm or more and 16 m or less, and further preferably 0.5 μm or more and 12 m or less.

When the average particle diameters of the catalysts are 0.1 μm or more, problems such as the scattering and adhesion of the obtained polyethylene powder tend to be able to be prevented.

When the average particle diameters of the catalysts are 20 μm or less, there is a tendency that too large a polyethylene powder is difficult to produce, which prevents settling of the polyethylene powder in the polymerization system, and there is also a tendency that problems, such as the blockage of a line, in a post-treatment process on polyethylene powder can be avoided.

The particle diameter distributions of the catalysts are preferably as narrow as possible, and fine powder particles and coarse powder particles can be removed by a sieve, centrifugation, or a cyclone.

The method for deactivating the catalysts used for the production of the polyethylene powder is not particularly limited but is preferably carried out after the polyethylene powder is separated from the solvent.

By introducing an agent for deactivating the catalysts after separation from the solvent, the precipitation of the catalyst components and so on dissolved in the solvent can be suppressed, and Ti, Al, Cl, and others derived from the catalyst components can be reduced.

Examples of the agent for deactivating the catalyst systems include, but are not limited to, oxygen, water, alcohols, glycols, phenols, carbon monoxide, carbon dioxide, ethers, carbonyl compounds, and alkynes.

The molecular weight of the polyethylene powder can be controlled by, for example, allowing hydrogen to be present in the polymerization system, or changing the polymerization temperature, as described in the DE 3127133A.

By adding hydrogen to the polymerization system as a chain transfer agent, the molecular weight of the polyethylene powder is easily controlled in a suitable range.

When hydrogen is added to the polymerization system, the mole fraction of hydrogen is preferably 0 mol % or more and 30 mol % or less, more preferably 0 mol % or more and 25 mol % or less, and further preferably 0 mol % or more and 20 mol % or less.

Examples of the solvent separation method in the method for producing the polyethylene powder of the present embodiment include a decantation method, a centrifugation method, and a filter filtration method.

In view of the high efficiency of the separation of the polyethylene powder from the solvent, the centrifugation method is preferable.

In the method for producing the polyethylene powder of the present embodiment, a drying step is preferably carried out after separation from the solvent.

The drying temperature in the drying step is usually preferably 50° C. or more and 150° C. or less, more preferably 50° C. or more and 140° C. or less, and further preferably 50° C. or more and 130° C. or less. When the drying temperature is 50° C. or more, efficient drying is possible. On the other hand, when the drying temperature is 150° C. or less, drying in a state in which the aggregation and thermal deterioration of the polyethylene powder are suppressed is possible.

(Additives)

The polyethylene powder of the present embodiment can contain, in addition to the components as described above, other known components useful for the production of the polyethylene powder. The polyethylene powder of the present embodiment, for example, may further contain additives such as a neutralizing agent, an antioxidant, and a light-resistant stabilizer.

The neutralizing agent is used as a catcher for chlorine contained in polyethylene or a fabrication aid, for example. Examples of the neutralizing agent include, but are not limited to, stearates of alkaline earth metals such as calcium, magnesium, and barium.

The content of the neutralizing agent is not particularly limited but is preferably 5,000 ppm or less, more preferably 4,000 ppm or less, and further preferably 3,000 ppm or less based on the total amount of polyethylene.

When the polyethylene powder of the present embodiment is an ethylene polymer obtained by a slurry polymerization method using a metallocene catalyst, it is also possible to exclude the halogen component from the catalyst constituents. In such a case, the neutralizing agent need not be used.

Examples of the antioxidant include, but are not limited to, phenol-based antioxidants such as dibutylhydroxytoluene, pentaerythritol-tetrakis[3-(3,5-di-t-butyl-4-hydroxyphenyl) propionate], and octadecyl-3-(3,5-di-t-butyl-4-hydroxyphenyl) propionate.

The content of the antioxidant is not particularly limited but is preferably 5,000 ppm or less, more preferably 4,000 ppm or less, and further preferably 3,000 ppm or less.

Examples of the light-resistant stabilizer include, but are not limited to, benzotriazole-based light-resistant stabilizers such as 2-(5-methyl-2-hydroxyphenyl)benzotriazole and 2-(3-t-butyl-5-methyl-2-hydroxyphenyl)-5-chlorobenzotriazole; and hindered amine-based light-resistant stabilizers such as bis(2,2,6,6-tetramethyl-4-piperidine) sebacate and poly[{6-(1,1,3,3-tetramethylbutyl)amino-1,3,5-triazine-2,4-diyl}{(2,2,6,6-tetramethyl-4-piperidyl) imino}hexamethylene{(2,2,6,6-tetramethyl-4-piperidyl) imino}].

The content of the light-resistant stabilizer is not particularly limited but is preferably 5,000 ppm or less, more preferably 4,000 ppm or less, and further preferably 3,000 ppm or less.

The content of the additives contained in the polyethylene powder of the present embodiment can be obtained by extracting the additives in the polyethylene powder by Soxhlet extraction for 6 hours using tetrahydrofuran (THF), and separating the extract by liquid chromatography for quantification.

[Applications]

The polyethylene powder of the present embodiment has a feature in that the extent of the entanglement of polyethylene molecules is moderately high, and can be applied to various applications by various processing methods.

(Molded Article)

The molded article of the present embodiment is a molded article of the polyethylene powder of the present embodiment described above.

The molded article of the present embodiment is excellent in strength, provides reduced tight winding, and also has small variations in air permeability, and therefore the molded article can be preferably used as a microporous membrane.

Examples of such a molded article include a separator for a battery, specifically a separator for a secondary battery, and particularly a separator for a lithium ion secondary battery and a separator for a lead storage battery.

The polyethylene powder of the present embodiment can also be preferably used for a fiber, utilizing the features of excellent wear resistance, excellent high sliding properties, excellent high strength, and excellent high impact properties, which are the characteristics of high molecular weight polyethylene powders.

The polyethylene powder of the present embodiment can be molded into a solid by, for example, extrusion, press molding, or cutting, and be used for gears, rolls, curtain rails, rails for pachinko balls, liner sheets for storage silos for grain and the like, coatings for imparting the sliding property for rubber products and the like, ski materials and ski soles, and lining materials for heavy machinery such as trucks and shovel loaders.

The polyethylene powder of the present embodiment can also be used for obtaining molded articles by sintering the polyethylene powder, and for filters, dust trap materials, and so on.

EXAMPLES

The present embodiment will be described in more detail below by way of specific Examples and Comparative Examples, but the present embodiment is not limited in any way by the following Examples and Comparative Examples.

Methods for measuring various characteristics and physical properties are shown below.

[Methods for Measuring Various Physical Properties and Characteristics]

(1) Viscosity-Average Molecular Weight (Mv)

First, 20 mg of a polyethylene powder was added to 20 mL of decalin (decahydronaphthalene), and the mixture was stirred at 150° C. for 2 hr to dissolve the polyethylene powder to obtain a solution.

For the solution, the falling time ($t_s$) between the marked lines was measured in a constant temperature bath at 135° C. using an Ubbelohde type viscometer.

In the same manner, three types of solutions were made by changing the mass of the polyethylene powder, and the falling time between the marked lines was measured in the same manner as above.

The falling time ($t_b$) of only decalin to which the polyethylene powder was not added, as a blank, was measured.

The reduced viscosities ($\eta_{sp}/C$) of polyethylene obtained according to the following (mathematical formula A) were plotted to derive a linear expression of concentration (C) (unit: g/dL) and the reduced viscosity ($\eta_{sp}/C$) of polyethylene, and the limiting viscosity ([$\eta$]) was obtained by extrapolation to zero concentration.

$$\eta_{sp}/C=(t_s/t_b-1)/C \text{(unit: dL/g)} \quad \text{(mathematical formula A)}$$

Next, the viscosity-average molecular weight (Mv) was calculated using the following (mathematical formula B) and using the value of the limiting viscosity ([$\eta$]) obtained by the above.

$$Mv=(5.34\times10^4)\times[\eta]^{1.49} \quad \text{(mathematical formula B)}$$

(2) Density

The density of a polyethylene powder was measured on a material obtained by cutting a section from a pressed sheet of the polyethylene powder, annealing it at 120° C. for 1 hr, and then cooling it at 25° C. for 1 hr.

The pressed sheet of the polyethylene powder was made according to ASTM D 1928 Procedure C using a mold 60 mm long, 60 mm wide, and 2 mm thick.

[3] $|\eta^*|_m$ and $d(\log|\eta^*|)/dT$

The measurement of complex viscosity with respect to temperature change was performed according to (Conditions for Measurement of Slurry Viscoelasticity) shown below, on the slurry composition including 30 parts by mass of a polyethylene powder and 70 parts by mass of a liquid paraffin described below.

For the complex viscosity $|\eta^*|$ with respect to each measurement temperature T, the logarithm to the base 10, $\log|\eta^*|$, was obtained, and a curve of "$d(\log|\eta^*|)/dT$," which represents the amount of complex viscosity change with respect to temperature change, was obtained.

In the temperature zone to the start of the dissolution of the polyethylene powder, fluctuations in $d(\log|\eta^*|)/dT$ due to slight measurement errors in complex viscosity were seen, but the fluctuations were not regarded as peaks. The number of peaks was determined taking, as individual peaks, peaks larger than the extent of the fluctuations seen in the temperature zone to the start of the dissolution of the polyethylene powder, which occurred after the dissolution of the polyethylene powder started and a clear increase in $d(\log|\eta^*|)/dT$ occurred. In addition, the values of the respective peaks were determined.

The temperature at a point in time when the value of $d(\log|\eta^*|)/dT$ associated with the dissolution of the polyethylene powder first reached 0.03 or less after passing a peak was regarded as the temperature at which the dissolution of the polyethylene powder was completed, and $|\eta^*|$ at the temperature was $|\eta^*|_m$.

<Conditions for Measurement of Slurry Viscoelasticity> measuring apparatus: MARS III manufactured by Thermo Fisher Scientific K.K.

stage: 20 mm 0 plate: 20 mm $\phi$ parallel plate gap: 0.5 mm slurry composition: 30 parts by mass of a polyethylene powder, 70 parts by mass of a liquid paraffin polyethylene powder: A powder passing through a sieve having an opening of 425 μm in accordance with the JIS Z 8801 standard was used for measurement.

sample setting procedure: The temperature of the sample stage was increased to measurement temperature, and the zero adjustment of the sensor was carried out. 0.126 g of the liquid paraffin was dropped on the sample stage. 0.054 g of the polyethylene powder was introduced into the liquid paraffin. The mixture was stirred several times using tweezers to uniformly disperse the polyethylene powder.

measurement conditions: The complex viscosity was measured by the following steps 1 to 2:

step 1 The slurry was kept at 100° C. for 2 min step 2 After the step 1, the temperature was increased from 100° C. to 140° C. at 1° C./min. The viscoelasticity during the temperature increase was measured at a frequency of 1 Hz and a strain of 10% under a nitrogen atmosphere.

Regarding the complex viscosity $|\eta^*|_m$, whether the following formula (1) and formula (2) held or not was determined.

$$590.0 \times (Mv \times 10^{-4})^{1.18} \geq |\eta^*|_m \geq 13.3 \times (Mv \times 10^{-4})^{1.18} \quad (1)$$

$$100.0 \times (Mv \times 10^{-4})^{1.18} \geq |\eta^*|_m > 20.0 \times (Mv \times 10^{-4})^{1.18} \quad (2)$$

(4) Amount of Powder Larger than 300 μm 100 g of a polyethylene powder was weighed into a 200 mL container, and 1 g of carbon black was added. The polyethylene powder was sufficiently stirred by a medicine spoon.

The stirred polyethylene powder was classified through a sieve having an opening of 300 μm in accordance with the JIS Z 8801 standard. From the mass of the polyethylene powder remaining on the sieve obtained at the time, the content (% by mass) of a powder larger than 300 μm was calculated.

(5) Isothermal Crystallization Time

Isothermal crystallization time (min) at 125° C. obtained by the following <Conditions for Measurement of Isothermal Crystallization Time> was measured using a differential scanning calorimeter (DSC).

The measurement was performed according to the following, and the time when an exothermic peak top due to crystallization was obtained was taken as the isothermal crystallization time, provided that the point in time when the temperature reached 125° C. in step A3 is regarded as the starting point (0 min).

<Conditions for Measurement of Isothermal Crystallization Time> step A1: A polyethylene powder was maintained at 50° C. for 1 min, and then the temperature was increased to 180° C. at a temperature increase rate of 10° C./min.

step A2: The polyethylene powder was maintained at 180° C. for 30 min, and then the temperature was decreased to 125° C. at a temperature decrease rate of 80° C./min.

step A3: The polyethylene powder was maintained at 125° C.

(6) Mw/Mn and Mz/Mw

The number-average molecular weight (Mn), weight-average molecular weight (Mw), z-average molecular weight (Mz), molecular weight distribution (Mw/Mn), and (Mz/Mw) of each resin were measured under the following conditions using GPC (gel permeation chromatography) in which a differential refractometer and a light scattering detector were connected.

PL-GPC200 containing a differential refractometer (RI) and a light scattering detector (PD2040) manufactured by Agilent was used.

As the columns, two of Agilent PLgel MIXED-A (13 μm, 7.5 mm I.D×30 cm) were coupled and used.

Measurement was performed at a column temperature of 160° C. with 1,2,4-trichlorobenzene (containing 0.05% by mass of 4,4'-Thiobis(6-tert-butyl-3-methylphenol) as an eluent under the conditions of a flow rate of 1.0 ml/min and an injected amount of 500 μL to obtain an RI chromatogram and light scattering chromatograms at scattering angles of 15° and 90°.

The number-average molecular weight (Mn), the weight-average molecular weight (Mw), and the z-average molecular weight (Mz) were obtained from the obtained chromatograms using Cirrus software.

The molecular weight distribution (Mz/Mw) was obtained using the values of these Mz and Mw, and the molecular weight distribution (Mw/Mn) was obtained using the values of Mw and Mn.

For the value of the refractive index increment of polyethylene, 0.053 mL/g was used.

(7) Making of Microporous Membrane

30% By mass of a polyethylene powder and 70% by mass of a liquid paraffin were uniformly melted and kneaded by a twin-screw extruder to obtain a polyethylene melted and kneaded material. For the melting and kneading conditions, the melting and kneading was performed at a set temperature of 200° C., a screw rotation rate of 170 rpm, and a discharged amount of 15 kg/hr. Then, the melted and kneaded material was extruded in the form of a sheet using a T-die (250 mm wide) maintained at 220° C. The melted and kneaded material was pressure-bonded and cooled by a metal roll controlled at a surface temperature of 60° C. to obtain a 1000 μm thick gel sheet excellent in thickness stability.

Next, the gel sheet was stretched in a ratio of 7×7 at a stretching temperature of 125° C. using a simultaneous biaxial stretching machine, then guided to a methyl ethyl ketone bath, and sufficiently immersed in methyl ethyl ketone to extract and remove the liquid paraffin. Then, the methyl ethyl ketone was dried and removed.

Then, the sheet was stretched in a ratio of 1.5 in the transverse direction at 120° C. by a tenter stretching machine and heat-set at 125° C.

Further, the microporous membrane was wound around a paper tube by a winding machine.

A tension detector was provided in the winding portion so that the tension could be controlled when the microporous membrane was wound around the winding core, and the tension of the microporous membrane was detected so that the output torque of the driving source could be controlled based on the detected value.

(8) Evaluation of Strength (Puncture Strength) of Molded Article

Measurement was performed using MX2-500N manufactured by IMADA CO., LTD. under the conditions of a radius of curvature of the needle tip of 0.5 mm and a puncture rate of 2 mm/sec, and evaluation was performed according to the following criteria:

A molded article having a puncture strength of 95 gf/m² or more was rated as ⊚.

A molded article having a puncture strength of 70 gf/m² or more and less than 95 gf/m² was rated as ○.

A molded article having a puncture strength of 50 gf/m² or more and less than 70 gf/m² was rated as ▲.

A molded article having a puncture strength of less than 50 gf/m² was rated as X.

(9) Evaluation of Tight Winding

From the outermost periphery of a roll of a microporous membrane, 25 cm of the microporous membrane was cut, and the membrane thickness was measured at 10 points at a room temperature of 23° C. using a micro-thickness gauge (type KBM) manufactured by Toyo Seiki Seisaku-sho, Ltd. The average value was taken as "the membrane thickness evaluated on a single sheet, t".

The outer diameter of a roll of 1000 μm of the microporous membrane wound around a winding core having an outer diameter of 102 mm was D (mm), and "the membrane thickness calculated from the diameter of the roll, T" was obtained by the following formula:

$$T \text{ (μm)} = \pi(D^2 - 102^2)/4000$$

The measurement of the outer diameter D of the roll including the slit and wound polyolefin microporous membrane was performed by measuring the outer diameter of the portion at every millimeter in the width direction, from 3 mm inside both edges in order to exclude both raised edges, and the average value was taken as D.

The tight winding was evaluated by the difference in membrane thickness, T–t.

A roll in which T–t was −0.5 μm or more was rated as ⊚.

A roll in which T–t was −1.0 μm or more and less than −0.5 μm was rated as ◯.

A roll in which T–t was −1.5 μm or more and less than −1.0 μm was rated as ▲.

A roll in which T–t was less than −1.5 μm was rated as X.

(10) Variations in Air Permeability

Air permeability was measured in accordance with JIS P-8117 using a Gurley air permeability meter (manufactured by Toyo Seiki Seisaku-sho, Ltd.). The measurement was performed at 10 points at least 5 cm away from each other, and their standard deviation was evaluated as variations in air permeability.

A molded article having a standard deviation of air permeability was less than 10 was rated as ⊚.

A molded article having a standard deviation of air permeability was 10 or more and less than 15 was rated as ◯.

A molded article having a standard deviation of air permeability was 15 or more and less than 30 was rated as ▲.

A molded article having a standard deviation of air permeability was 30 or more was rated as X.

[Production Example] Synthesis of Catalyst
(Synthesis of Solid Catalyst Component [A-1])
<(1) Preparation of Starting Material (a-1)>

In an 8 L stainless steel autoclave sufficiently purged with nitrogen, 2,000 mL of a 1 mol/L $Mg_6(C_4H_9)_{12}Al(C_2H_5)_3$ solution in hexane (corresponding to 2000 mmol of magnesium and aluminum) was placed, and 146 mL of a 5.47 mol/L n-butanol solution in hexane was dropped over 3 hr with stirring at 50° C. After completion, the line was washed with 300 mL of hexane.

Further, the stirring was continued at 50° C. over 2 hr. The material cooled to normal temperature after the completion of the reaction was designated as (a-1). The starting material (a-1) had a magnesium concentration of 0.712 mol/L.

<(2) Preparation of Starting Material (a-2)>

In an 8 L stainless steel autoclave sufficiently purged with nitrogen, 2,000 mL of a 1 mol/L $Mg_6(C_4H_9)_{12}Al(C_2H_5)_3$ solution in hexane (corresponding to 2000 mmol of magnesium and aluminum) was placed, and 240 mL of an 8.54 mol/L methylhydrogenpolysiloxane (manufactured by Shin-Etsu Chemical Co., Ltd.) solution in hexane was dropped over 3 hr with stirring at 80° C. After completion, the line was washed with 300 mL of hexane. Further, the stirring was continued at 80° C. over 2 hr.

The material cooled to normal temperature after the completion of the reaction was designated as a starting material (a-2). The starting material (a-2) had a total concentration of magnesium and aluminum of 0.784 mol/L.

<(3) Preparation of (A-1) Support>

In an 8 L stainless steel autoclave sufficiently purged with nitrogen, 1,000 mL of a 1 mol/L hydroxytrichlorosilane solution in hexane was placed, and 1340 mL of a solution of the organomagnesium compound of the starting material (a-1) (corresponding to 943 mmol of magnesium) in hexane was dropped over 3 hr at 65° C. Further, the reaction was continued at 65° C. for 1 hr with stirring. After the completion of the reaction, the supernatant liquid was removed, followed by washing the residue four times with 1,800 mL of hexane to obtain a support (A-1). This support (A-1) was analyzed, and as a result, the amount of magnesium contained was 7.2 mmol per gram of the solid.

<(4) Synthesis of Solid Catalyst Component [A-1]>

103 mL of a 1 mol/L titanium tetrachloride solution in hexane and 131 mL of the starting material (a-2) were simultaneously added to 1,970 mL of a slurry containing 110 g of the support (A-1) in hexane over 3 hr with stirring at 10° C. After the addition, the reaction was continued at 10° C. for 1 hr. After the completion of the reaction, the supernatant liquid was removed, followed by washing the residue four times with hexane to remove the unreacted starting material components to obtain a solid catalyst component [A-1].

(Synthesis of Solid Catalyst Component [A-2])

A solid catalyst component [A-2] was obtained in the same manner as of the synthesis of the solid catalyst component [A-1] except the following: the temperature and the time when the titanium tetrachloride solution in hexane and the starting material (a-2) were simultaneously added to the slurry containing the support (A-1) in hexane were −10° C. and 20 hr, respectively, and the reaction was continued at −10° C. for 1 hr after the addition.

(Synthesis of Solid Catalyst Component [A-3])

A solid catalyst component [A-3] was obtained in the same manner as of the synthesis of the solid catalyst component [A-1] except that the concentration of the titanium tetrachloride was 0.1 mol/L.

Example 1

A mixed gas of ethylene and hydrogen adjusted so that the hydrogen concentration was 10 mol % based on ethylene was pressurized at 0.2 MPa and dissolved in hexane to obtain ethylene-dissolved hexane.

The ethylene-dissolved hexane was introduced into a vessel type 300 L polymerization reactor equipped with a stirring blade through a supply line at a rate of 40 L/hr.

Catalyst supply lines were installed in two places. One line was adjusted so that the one line was in a portion where the liquid level of the polymerization slurry was shallow, and the other line was adjusted so that the other line was in a portion where the liquid level of the polymerization slurry was deep.

For the catalyst, the same amount of the solid catalyst component [A-2] and the solid catalyst component [A-3] were previously mixed, and used.

Catalyst supply lines were installed in two places and adjusted; specifically, a catalyst line 1 was introduced into a portion where the liquid level of the polymerization slurry was shallow, and a catalyst line 2 was introduced into a portion where the liquid level of the polymerization slurry was deep. The amount of the catalyst introduced was adjusted; specifically, 70% by mass of the total amount of the catalyst was introduced from the catalyst line 1, and 30% by mass of the total amount of the catalyst was introduced from the catalyst line 2. The catalyst in the catalyst line 1 was introduced at 75° C., and the catalyst in the catalyst line 2 was introduced at 30° C. The catalyst in the catalyst line 2 was previously brought into contact with triisobutylaluminum in an amount of 0.5% by mass based on the catalyst.

The introduction of the catalyst was controlled so that the catalyst was introduced every 30 seconds at a rate of 0.3 g/hr, and that the time of contact with the ethylene-dissolved hexane was 0.7 to 1.0 min. Triisobutylaluminum and the Tebbe reagent were added at a rate of 7.5 mmol/hr and at a rate of 0.45 µmol/hr respectively so as not to overlap with the timing of the introduction of the catalyst.

The reaction was continuously performed under the condition of an average residence time of 2.1 hr at a polymerization pressure in the polymerization reactor of 0.60 MPa and a polymerization temperature kept at 75° C. by jacket cooling.

Separately from the supply lines, hexane was introduced at 40 L/hr from the upper portion of the polymerization reactor, and ethylene and hydrogen were introduced from the gas phase portion of the polymerization reactor. Hydrogen was continuously supplied by a pump so that the hydrogen concentration was 8 mol % based on the gas phase ethylene in the polymerization reactor.

The polymerization slurry was continuously fed to a centrifuge from the bottom of the polymerization reactor so that the level of the polymerization reactor was kept constant. The polyethylene powder was separated from the solvent and the others than the polyethylene powder.

The separated polyethylene powder was dried with nitrogen blowing at 90° C. In this drying step, steam was sprayed onto the polyethylene powder after the polymerization to carry out the deactivation of the catalyst and the promoters. The obtained polyethylene powder was passed through a sieve having an opening of 425 µm, and the polyethylene powder not passing through the sieve was removed to obtain a polyethylene powder having a viscosity-average molecular weight (Mv) of $88\times10^4$ g/mol. The physical properties of the obtained polyethylene powder are shown in Table 1.

Example 2

The polyethylene powder of Example 2 having a viscosity-average molecular weight (Mv) of $90\times10^4$ g/mol was obtained by the same operation as Example 1 except the following: in the polymerization step, the polymerization temperature was 78° C., the polymerization pressure was 0.5 MPa, the hydrogen concentration in the polymerization reactor was 6 mol %, and 30% by mass of the total amount of the catalyst was introduced from the catalyst line 1 while 70% by mass of the total amount of the catalyst was introduced from the catalyst line 2. The physical properties of the obtained polyethylene powder are shown in Table 1.

Example 3

The polyethylene powder of Example 3 having a viscosity-average molecular weight (Mv) of $26\times10^4$ g/mol was obtained by the same operation as Example 1 except the following: in the polymerization step, the polymerization temperature was 79° C., the polymerization pressure was 0.5 MPa, and the hydrogen concentration in the polymerization reactor was 10 mol %. The physical properties of the obtained polyethylene powder are shown in Table 1.

Example 4

The polyethylene powder of Example 4 having a viscosity-average molecular weight (Mv) of $44\times10^4$ g/mol was obtained by the same operation as Example 1 except the following: in the polymerization step, the polymerization temperature was 79° C., the polymerization pressure was 0.5 MPa, and the hydrogen concentration in the polymerization reactor was 8.5 mol %. The physical properties of the obtained polyethylene powder are shown in Table 1.

Example 5

The polyethylene powder of Example 5 having a viscosity-average molecular weight (Mv) of $50\times10^4$ g/mol was obtained by the same operation as Example 1 except the following: in the polymerization step, the polymerization temperature was 77° C., the hydrogen concentration in the polymerization reactor was 8.6 mol %, and only the solid catalyst component [A-2] was used for the catalyst. The physical properties of the obtained polyethylene powder are shown in Table 1.

Example 6

The polyethylene powder of Example 6 having a viscosity-average molecular weight (Mv) of $250\times10^4$ g/mol was obtained by the same operation as Example 1 except the following: in the polymerization step, the polymerization temperature was 78° C., the polymerization pressure was 0.5 MPa, the hydrogen concentration in the polymerization reactor was 2 mol %, and 30% by mass of the total amount of the catalyst was introduced from the catalyst line 1, while 70% by mass of the total amount of the catalyst was introduced from the catalyst line 2. The physical properties of the obtained polyethylene powder are shown in Table 1.

Example 7

The polyethylene powder of Example 7 having a viscosity-average molecular weight (Mv) of $105\times10^4$ g/mol was obtained by the same operation as Example 1 except the following: in the polymerization step, the polymerization temperature was 78° C., the polymerization pressure was 0.5 MPa, the hydrogen concentration in the polymerization reactor was 5.5 mol %, and the catalyst in the catalyst line 2 was previously brought into contact with triisobutylaluminum in an amount of 0.1% by mass based on the catalyst. The physical properties of the obtained polyethylene powder are shown in Table 1.

Example 8

The polyethylene powder of Example 8 having a viscosity-average molecular weight (Mv) of $24\times10^4$ g/mol was obtained by the same operation as Example 1 except the following: in the polymerization step, the polymerization temperature was 79° C., the polymerization pressure was 0.5 MPa, the hydrogen concentration in the polymerization reactor was 10.2 mol %, and the catalyst in the catalyst line 2 was previously brought into contact with triisobutylaluminum in an amount of 0.1% by mass based on the catalyst. The physical properties of the obtained polyethylene powder are shown in Table 2.

Example 9

The polyethylene powder of Example 9 having a viscosity-average molecular weight (Mv) of $40\times10^4$ g/mol was obtained by the same operation as Example 1 except the following: in the polymerization step, the polymerization temperature was 79° C., the hydrogen concentration in the polymerization reactor was 9 mol %, and the solid catalyst component [A-2] and the solid catalyst component [A-3] were used at 20:80 for the catalyst. The physical properties of the obtained polyethylene powder are shown in Table 2.

Example 10

The polyethylene powder of Example 10 having a viscosity-average molecular weight (Mv) of $35\times10^4$ g/mol was obtained by the same operation as Example 1 except the following: in the polymerization step, the polymerization temperature was 79° C., the polymerization pressure was 0.5 MPa, the hydrogen concentration in the polymerization reactor was 9.3 mol %, and only the solid catalyst component [A-3] was used for the catalyst. The physical properties of the obtained polyethylene powder are shown in Table 2.

Example 11

The polyethylene powder of Example 11 having a viscosity-average molecular weight (Mv) of $75 \times 10^4$ g/mol was obtained by the same operation as Example 1 except the following: in the polymerization step, the hydrogen concentration in the polymerization reactor was 7 mol %, the temperature of the catalyst in the catalyst line 2 was 75° C., and 1-butene as a comonomer was introduced so as to be 5 mol % based on the gas phase concentration of ethylene. The physical properties of the obtained polyethylene powder are shown in Table 2.

Example 12

The polyethylene powder of Example 12 having a viscosity-average molecular weight (Mv) of $26 \times 10^4$ g/mol was obtained by the same operation as Example 1 except the following: in the polymerization step, the polymerization temperature was 78° C., the polymerization pressure was 0.5 MPa, the hydrogen concentration in the polymerization reactor was 10.1 mol %, and the catalyst in the catalyst line 2 was not previously brought into contact with triisobutylaluminum. The physical properties of the obtained polyethylene powder are shown in Table 2.

Example 131

The polyethylene powder of Example 13 having a viscosity-average molecular weight (Mv) of $93 \times 10^4$ g/mol was obtained by the same operation as Example 1 except the following: the obtained polyethylene powder was passed through a sieve having an opening of 106 μm, and the polyethylene powder passing through the sieve was removed. The physical properties of the obtained polyethylene powder are shown in Table 2.

Example 14

A polyethylene powder having a viscosity-average molecular weight (Mv) of $89 \times 10^4$ g/mol was obtained by the same operation as Example 1 except the following: in the polymerization step, only the solid catalyst component [A-2] was used for the catalyst.
A polyethylene powder having a viscosity-average molecular weight (Mv) of $51 \times 10^4$ g/mol was obtained by the same operation as Example 1 except the following: in the polymerization step, the polymerization temperature was 76° C., the hydrogen concentration in the polymerization reactor was 8.6 mol %, only the solid catalyst component [A-3] was used for the catalyst, and the temperature of the catalyst in the catalyst line 2 was 75° C.
The two types of polyethylene powders obtained as described above were mixed each in an amount of 50% by mass to obtain the polyethylene powder of Example 14 having a viscosity-average molecular weight (Mv) of $71 \times 10^4$ g/mol as a whole. The physical properties of the obtained polyethylene powder are shown in Table 2.

Comparative Example 1

The polyethylene powder of Comparative Example 1 having a viscosity-average molecular weight (Mv) of $16 \times 10^4$ g/mol was obtained by the same operation as Example 1 except the following: in the polymerization step, the polymerization temperature was 70° C., the polymerization pressure was 0.5 MPa, the hydrogen concentration in the polymerization reactor was 17 mol %, the catalyst in the catalyst line 2 was not previously brought into contact with triisobutylaluminum, the temperature of the catalyst in the catalyst line 2 was 75° C., the solid catalyst component [A-1] and the solid catalyst component [A-3] were used at a mass ratio of 50:50 for the catalyst, and 1-butene as a comonomer was introduced so as to be 10 mol % based on the gas phase concentration of ethylene. The physical properties of the obtained polyethylene powder are shown in Table 3.

Comparative Example 2

The polyethylene powder of Comparative Example 2 having a viscosity-average molecular weight (Mv) of $340 \times 10^4$ g/mol was obtained by the same operation as Example 1 except the following: in the polymerization step, the polymerization temperature was 77° C., the polymerization pressure was 0.5 MPa, the hydrogen concentration in the polymerization reactor was 1.5 mol %, the temperature of the catalyst in the catalyst line 2 was 75° C., and only the solid catalyst component [A-1] was used for the catalyst. The physical properties of the obtained polyethylene powder are shown in Table 3.

Comparative Example 3

The polyethylene powder of Comparative Example 3 having a viscosity-average molecular weight (Mv) of $72 \times 10^4$ g/mol was obtained by the same operation as Example 1 except the following: in the polymerization step, the polymerization temperature was 77° C., the polymerization pressure was 0.5 MPa, the hydrogen concentration in the polymerization reactor was 7.1 mol %, all the catalyst was introduced from the catalyst line 2, the temperature of the catalyst in the catalyst line 2 was 40° C., only the solid catalyst component [A-2] was used for the catalyst, and the catalyst in the catalyst line 2 was not previously brought into contact with triisobutylaluminum. The physical properties of the obtained polyethylene powder are shown in Table 3.

Comparative Example 4

The polyethylene powder of Comparative Example 4 having a viscosity-average molecular weight (Mv) of $85 \times 10^4$ g/mol was obtained by the same operation as Example 1 except the following: in the polymerization step, all the catalyst was introduced from the catalyst line 2, the temperature of the catalyst in the catalyst line 2 was 40° C., the solid catalyst component [A-2] and the solid catalyst component [A-3] were used at 40:60 for the catalyst, and the catalyst in the catalyst line 2 was not previously brought into contact with triisobutylaluminum. The physical properties of the obtained polyethylene powder are shown in Table 3.

Comparative Example 5

The polyethylene powder of Comparative Example 5 having a viscosity-average molecular weight (Mv) of $38 \times 10^4$ g/mol was obtained by the same operation as Example 1 except the following: in the polymerization step, the polymerization temperature was 77° C., the polymerization pressure was 0.5 MPa, the hydrogen concentration in the polymerization reactor was 9.2 mol %, only the solid catalyst component [A-1] was used for the catalyst, the catalyst in the catalyst line 2 was not previously brought into contact with triisobutylaluminum, and only the catalyst line 1 was used. The physical properties of the obtained polyethylene powder are shown in Table 3.

Comparative Example 61

The polyethylene powder of Comparative Example 6 having a viscosity-average molecular weight (Mv) of 180× $10^4$ g/mol was obtained by the same operation as Example 1 except the following: in the polymerization step, the polymerization temperature was 78° C., the hydrogen concentration in the polymerization reactor was 4 mol %, only the solid catalyst component [A-1] was used for the catalyst, the catalyst in the catalyst line 2 was not previously brought into contact with triisobutylaluminum, and only the catalyst line 1 was used. The physical properties of the obtained polyethylene powder are shown in Table 3.

TABLE 1

|  | Unit | Example 1 | Example 2 | Example 3 | Example 4 | Example 5 | Example 6 | Example 7 |
|---|---|---|---|---|---|---|---|---|
| Viscosity-average molecular weight | $10^4$ g/mol | 88 | 90 | 26 | 60 | 50 | 250 | 105 |
| Density | kg/m³ | 941 | 941 | 945 | 943 | 942 | 933 | 938 |
| |η*|m | Pas | 11000 | 7450 | 2200 | 1800 | 1200 | 20300 | 4060 |
| Formula (1) |  | Yes | Yes | Yes | Yes | Yes | Yes | Yes |
| Formula (2) |  | Yes | Yes | Yes | No | No | Yes | No |
| Values of peaks of d(log|η*|)/dT | — | 1.3, 1.7 | 1.1, 2.4 | 1.1, 1.9 | 0.9, 2.1 | 1.2, 1.7 | 1.1, 2.6 | 1.0, 2.2 |
| Number of peaks of d(log|η*|)/dT | — | 2 | 2 | 2 | 2 | 2 | 2 | 2 |
| Particles larger than 300 μm | % by mass | 1.2 | 1.6 | 0.7 | 1.4 | 0.4 | 1.1 | 1.0 |
| Ethylene homopolymerization | — | ○ | ○ | ○ | ○ | ○ | ○ | ○ |
| Isothermal crystallization time | min | 2.5 | 2.5 | 3.1 | 2.3 | 2.6 | 3.6 | 1.8 |
| Strength of molded article | — | ◎ | ◎ | ◎ | ○ | ○ | ◎ | Δ |
| Tight winding | — | ◎ | ◎ | ◎ | ◎ | ◎ | Δ | ○ |
| Variations in air permeability | — | ◎ | ◎ | ◎ | ◎ | ◎ | Δ | ○ |

TABLE 2

|  | Unit | Example 8 | Example 9 | Example 10 | Example 11 | Example 12 | Example 13 | Example 14 |
|---|---|---|---|---|---|---|---|---|
| Viscosity-average molecular weight | $10^4$ g/mol | 24 | 40 | 35 | 75 | 26 | 93 | 71 |
| Density | kg/m³ | 946 | 944 | 943 | 940 | 945 | 940 | 941 |
| |η*|m | Pas | 1310 | 17200 | 7270 | 5300 | 720 | 13100 | 6400 |
| Formula (1) |  | Yes | Yes | Yes | Yes | Yes | Yes | Yes |
| Formula (2) |  | Yes | No | No | Yes | No | Yes | Yes |
| Values of peaks of d(log|η*|)/dT | — | 1.2, 2.0 | 0.8, 2.1 | 1.1 | 1.1, 2.8 | 1.1, 1.8 | 0.7, 1.1 | 2.8, 3.1 |
| Number of peaks of d(log|η*|)/dT | — | 2 | 2 | 1 | 2 | 2 | 2 | 2 |
| Particles larger than 300 μm | % by mass | 0.7 | 0.9 | 0.4 | 1.2 | 2.1 | 8.2 | 1 |
| Ethylene homopolymerization | — | ○ | ○ | ○ | X | ○ | ○ | ○ |
| Isothermal crystallization time | min | 2.2 | 3.7 | 5.7 | 2.9 | 3 | 3.4 | 3.1 |
| Strength of molded article | — | ○ | ○ | Δ | ○ | ○ | ◎ | ○ |
| Tight winding | — | ◎ | ○ | Δ | Δ | ○ | Δ | ○ |
| Variations in air permeability | — | ◎ | ○ | Δ | Δ | ○ | Δ | Δ |

TABLE 3

| | Unit | Comparative Example 1 | Comparative Example 2 | Comparative Example 3 | Comparative Example 4 | Comparative Example 5 | Comparative Example 6 |
|---|---|---|---|---|---|---|---|
| Viscosity-average molecular weight | $10^4$ g/mol | 16 | 340 | 72 | 85 | 38 | 180 |
| Density | kg/m$^3$ | 941 | 930 | 941 | 940 | 945 | 935 |
| $|\eta^*|_m$ | Pa·s | 610 | 20900 | 19784 | 9470 | 860 | 3210 |
| Formula (1) | — | Yes | Yes | Yes | Yes | No | No |
| Formula (2) | — | Yes | Yes | Yes | Yes | No | No |
| Values of peaks of d(log$|\eta^*|$)/dT | — | 1.5 | 1.1 | 3.4 | 0.8 | 2.3 | 2.3 |
| Number of peaks of d(log$|\eta^*|$)/dT | — | 1 | 1 | 1 | 1 | 1 | 1 |
| Particles larger than 300 μm | % by mass | 1.5 | 0.6 | 1.1 | 0.6 | 0.2 | 0.5 |
| Ethylene homopolymerization | — | X | ○ | ○ | ○ | ○ | ○ |
| Isothermal crystallization time | min | 6.2 | 5.5 | 3.1 | 3.5 | 4.8 | 4.2 |
| Strength of molded article | — | X | X | Δ | ○ | X | X |
| Tight winding | — | ○ | Δ | Δ | X | Δ | Δ |
| Variations in air permeability | — | ○ | ○ | X | Δ | Δ | Δ |

In the polyethylene powders of the Examples, the polyethylene molecular chains had moderate entanglement of polyethylene molecules, and microporous membranes having high mechanical strength, providing reduced tight winding, and having small variations in air permeability were produced from the polyethylene powders of the Examples.

This application claims priority to Japanese Patent Application No. 2020-015473 filed to the Japan Patent Office on Jan. 31, 2020, the contents of which are incorporated herein by reference.

INDUSTRIAL APPLICABILITY

The polyethylene powder of the present invention has industrial applicability as a material for various microporous membranes and a separator for a battery.

The invention claimed is:

1. A polyethylene powder satisfying the following Requirements 1 to 3:
   Requirement 1: viscosity-average molecular weight (Mv) is 200,000 or more and 3,000,000 or less
   Requirement 2: complex viscosity $|\eta^*|_m$, obtained by measurement under the following <Conditions for Measurement of Slurry Viscoelasticity,> satisfies the following formula (1):

$$590.0 \times (Mv \times 10^{-4})^{1.18} \geq |\eta^*|_m \geq 13.3 \times (Mv \times 10^{-4})^{1.18} \quad (1)$$

<Conditions for Measurement of Slurry Viscoelasticity>
measuring apparatus: MARS III manufactured by Thermo Fisher Scientific K.K.
stage: 20 mm ϕ
plate: 20 mm ϕ parallel plate
gap: 0.5 mm
slurry composition: 30 parts by mass of a polyethylene powder, 70 parts by mass of a liquid paraffin
the polyethylene powder: a powder passing through a sieve having an opening of 425 μm in accordance with a JIS Z 8801 standard is used for measurement
measurement conditions: complex viscosity $|\eta^*|$ is measured by the following steps 1 to 2:
step 1: a slurry is kept at 100° C. for 2 min
step 2: after the step 1, temperature is increased from 100° C. to 140° C. at 1° C./min, and viscoelasticity during the temperature increase is measured at a frequency of 1 Hz and a strain of 10% under a nitrogen atmosphere
determination of $|\eta^*|_m$: a temperature at a point in time when a value of d(log$|\eta^*|$)/dT associated with dissolution of the polyethylene powder first reaches 0.03 or less after passing a peak is regarded as a temperature at which the dissolution of the polyethylene powder is completed, and complex viscosity $|\eta^*|$ at the temperature is $|\eta^*|_m$;
wherein T is measurement temperature
   Requirement 3: a value of any peak when d(log$|\eta^*|$)/dT is plotted against temperature is 1.0 or more and 3.0 or less.

2. The polyethylene powder according to claim 1, wherein a number of peaks when d(log$|\eta^*|$)/dT is plotted against temperature is 2 or more.

3. The polyethylene powder according to claim 1, wherein a value of the $|\eta^*|_m$ is $1.0 \times 10^3$ or more and $3.0 \times 10^4$ or less.

4. The polyethylene powder according to claim 1, wherein an amount of a fraction remaining on a sieve having an opening of 300 μm obtained by classification is 3.0% by mass or less.

5. The polyethylene powder according to claim 1, wherein isothermal crystallization time at 125° C. obtained by the following <Conditions for Measurement of Isothermal Crystallization Time> is less than 4.0 min, <Conditions for Measurement of Isothermal Crystallization Time>
step A1: the polyethylene powder is maintained at 50° C. for 1 min, and then temperature is increased to 180° C. at a temperature increase rate of 10° C./min
step A2: the polyethylene powder is maintained at 180° C. for 5 min, and then the temperature is decreased to 125° C. at a temperature decrease rate of 80° C./min
step A3: the polyethylene powder is maintained at 125° C., and a time when an exothermic peak top due to crystallization is obtained is taken as isothermal crystallization time, provided that a point in time when the temperature reaches 125° C. is regarded as a starting point of 0 min.

6. The polyethylene powder according to claim 1, wherein the polyethylene powder is an ethylene homopolymer.

7. The polyethylene powder according to claim 1, wherein the viscosity-average molecular weight (Mv) is 230,000 or more and 2,800,000 or less.

8. The polyethylene powder according to claim 1, wherein the viscosity-average molecular weight (Mv) is 250,000 or more and 2,200,000 or less.

9. The polyethylene powder according to claim 1, wherein the complex viscosity $|\eta^*|_m$ satisfies the following formula (2):

$$100.0 \times (Mv \times 10^{-4})^{1.18} \geq |\eta^*|_m > 20.0 \times (Mv \times 10^{-4})^{1.18} \quad (2).$$

10. The polyethylene powder according to claim 1, wherein the value of any peak when $d(\log|\eta^*|)/dT$ is plotted against temperature is 1.2 or more and 2.7 or less.

11. The polyethylene powder according to claim 1, wherein the value of any peak when $d(\log|\eta^*|)/dT$ is plotted against temperature is 1.4 or more and 2.5 or less.

12. The polyethylene powder according to claim 1, wherein a value of a maximum peak when $d(\log|\eta^*|)/dT$ is plotted against temperature is 1.0 or more and 3.0 or less.

13. The polyethylene powder according to claim 1, wherein the value of the maximum peak when $d(\log|\eta^*|)/dT$ is plotted against temperature is 1.2 or more and 2.7 or less.

14. The polyethylene powder according to claim 1, wherein the value of the maximum peak when $d(\log|\eta^*|)/dT$ is plotted against temperature is 1.4 or more and 2.5 or less.

15. The polyethylene powder according to claim 1, wherein a value of the complex viscosity $|\eta^*|_m$ is $2.0 \times 10^3$ or more and $1.5 \times 10^4$ or less.

16. The polyethylene powder according to claim 1, wherein Mw/Mn and Mz/Mw obtained by GPC (gel permeation chromatography) measurement in which a differential refractometer and a light scattering detector are connected are 4.0 or more and 10.0 or less, and 2.0 or more and 7.0 or less, respectively.

17. A molded article of the polyethylene powder according to claim 1.

18. The molded article according to claim 17, wherein the molded article is a separator for a battery.

19. The molded article according to claim 18, wherein the molded article is a separator for a lithium ion secondary battery.

20. The polyethylene powder according to claim 2, wherein a value of the $|\eta^*|_m$ is $1.0 \times 10^3$ or more and $3.0 \times 10^4$ or less.

* * * * *